United States Patent [19]

Mee

[11] Patent Number: 5,120,243

[45] Date of Patent: Jun. 9, 1992

[54] ALIGNMENT SYSTEMS FOR DOCKING OF ORBITAL REPLACEMENT UNITS

[75] Inventor: Francis H. A. Mee, Alliston, Canada

[73] Assignee: Canadian Space Agency/Agence Spaciale Canadienne, Montreal, Canada

[21] Appl. No.: 611,547

[22] Filed: Oct. 25, 1990

[51] Int. Cl.⁵ .......................................... H01R 13/623
[52] U.S. Cl. .................................. 439/364; 439/248; 24/287
[58] Field of Search ................. 24/287, 648, 645, 647; 403/330, 316, 319, 327; 410/52, 71, 76, 77, 80, 84; 439/362–365, 359, 157, 153, 377, 248; 244/161

[56] References Cited

U.S. PATENT DOCUMENTS

| | | | |
|---|---|---|---|
| 3,209,302 | 9/1965 | Uberbacher | 439/364 X |
| 3,399,921 | 9/1968 | Trost et al. | 410/80 X |
| 3,984,117 | 10/1976 | Bates et al. | 410/77 X |
| 4,070,081 | 1/1978 | Takahashi | 439/157 X |
| 4,178,051 | 12/1979 | Kocher et al. | 439/157 |
| 4,537,454 | 8/1985 | Douty et al. | 439/157 |
| 4,807,834 | 2/1989 | Cohen | 244/161 X |
| 5,005,786 | 4/1991 | Okamoto et al. | 244/161 |

Primary Examiner—James R. Brittain
Attorney, Agent, or Firm—Francis W. Lemon

[57] ABSTRACT

An alignment lever is provided for aligning a load item with respect to a target. The alignment lever has a body which has a V-shaped alignment seat. The body is pivotally mounted to displace the seat through an arc of about 45°. A plurality of these alignment levers are used to provide an alignment assembly that is effective for aligning a load item with respect to a target area as the load item moves toward the target area. The alignment levers are located at spaced locations about the perimeter of the target area and serve to provide a target zone which is larger than the target area. An orbital replacement unit is provided which is releasably attachable to a target area of a support structure in which a first electrical connector and nut are mounted in a predetermined spaced relationship. The orbital replacement unit includes a housing in which a threaded shaft is mounted for engagement with the nut. A load transfer mechanism is provided for connecting the shaft to a connector assembly on which a second electrical connector is mounted to mate with the first electrical connector. The mechanism serves to apply a preload at the interface between the orbital replacement unit and the support structure before the electrical connectors are mated. The mechanism also serves to ensure that the electrical connectors can be forcibly separated from one another when the orbital replacement unit is being disconnected from the support structure.

4 Claims, 4 Drawing Sheets

ALIGNMENT SYSTEMS FOR DOCKING OF ORBITAL REPLACEMENT UNITS

BACKGROUND OF THE INVENTION

This invention relates to an alignment lever assembly in orbital replacement unit alignment and connector systems.

The need for a simple and effective alignment system for use when docking orbital replacement units has been recognized and the industry has called for proposals to meet this requirement.

The industry has also drawn attention to the difficulties experienced in attempting to form an effective electrical connection between the ORU and its docking station.

When operating in a hostile environment such as outer space, it may be difficult to distinguish one ORU from another and as a result, there is always a risk that an incompatible ORU may be docked at a particular docking station and if electrical connections are made with the incompatible ORU, damage could result to the ORU and the system to which it is connected. To alleviate this problem, I have designed a connector system which will prevent the forming of an electrical connection between a docking station and an incompatible ORU.

There are, however, circumstances where it may be essential to maintain at least one electrical connection between any one docking station and an incompatible ORU and the connector system that I have devised serves to meet this requirement.

SUMMARY OF THE INVENTION

It is an object of this invention to provide a simple and efficient alignment lever for receiving and aligning a load item with respect to a target.

It is a further object of the present invention to provide an alignment assembly for aligning a load item with respect to a target area which employs a plurality of alignment levers.

It is a still further objection of the present invention to provide an orbital replacement unit which is releasably attachable to a target area of a support structure in which a first electrical connector and a nut are mounted in a spaced relationship and wherein the unit includes a connector assembly and a load transfer bracket for moving the connector assembly to and fro between a retracted position and an extended position to connect and disconnect the first and second connectors.

According to the present invention there is provided an alignment lever assembly for receiving and aligning a load item comprising;
a) a body which has a bottom arm and a side arm that diverge outwardly from a corner portion located at the junction of the proximal ends thereof, the bottom arm and the side arm having a bottom face and a side face respectively that cooperate with one another to form a V-shaped alignment seat therebetween which serves to accommodate the corner of the load item.
b) a base for supporting the body proximate a target area,
c) pivot means pivotally connecting the corner portion of the body to the base for pivotal movement of the body, by the load, with respect to the base to rotate the alignment seat through an arc of about 45° between a first, outwardly inclined, position and a second, load accommodating position
d) biasing means engaging the base and the body and normally urging said body means to said first position,
e) means for releasably retaining the body with respect to the base when the alignment seat is in said second position,
f) said bottom arm having a distal end at which an end face is located which is inclined forwardly from the bottom face and away from the side face of the alignment seat to form a strike face that extends substantially parallel to the base,
g) said side arm having a distal end at which a load retaining finger is located which extends inwardly of the alignment seat from the side face thereof to overly a portion of the bottom face and releasably retain a load item therebetween when said alignment seat in said second position in use.

Further, according to the present invention there is provided an alignment lever assembly for aligning a load item with a target area as the load item moves toward the target area in a direction that is substantially perpendicular to the target area, the target area being located within a perimeter, the load item having docking corners formed between an end wall and a side wall thereof said assembly comprising;
a) a plurality of alignment levers each comprising;
   i) a body which has a V-shaped alignment seat formed between a bottom face and a side face and arranged to accommodate the corner of a load item,
   ii) pivot means adjacent proximal ends of the bottom and side faces supporting the body for pivotal movement of the alignment seat between a first position and a second position,
b) said alignment levers being located at spaced locations about the perimeter of the target area for pivotal movement such that the first position is one in which the side faces of the seats are inclined outwardly and upwardly from the target area to form a target zone which is larger that the target area and wherein the bottom faces are upwardly and inwardly inclined with respect to the target area to form contacts which overly the target area so as to contact the load item as it approaches the target area to be driven thereby to the second, load accommodating position in which the bottom and side faces of the seats extend in a releasably retaining, face-to-face relationship with respect to the end and side faces of a load item when it is aligned with and seated on the target area, the movement of the side faces of the lever arms from the first position to the second position serving to align the load item with the target area when the load item is initially located within the target zone and out of alignment with the target area.

In some embodiments of the present invention each bottom arm has a distal end which has an end face formed thereon which is inclined at an angle with respect to the bottom face so as to be generally horizontally disposed when the alignment seat is in said first position.

DESCRIPTION OF THE PREFERRED EMBODIMENT

Figure 1:
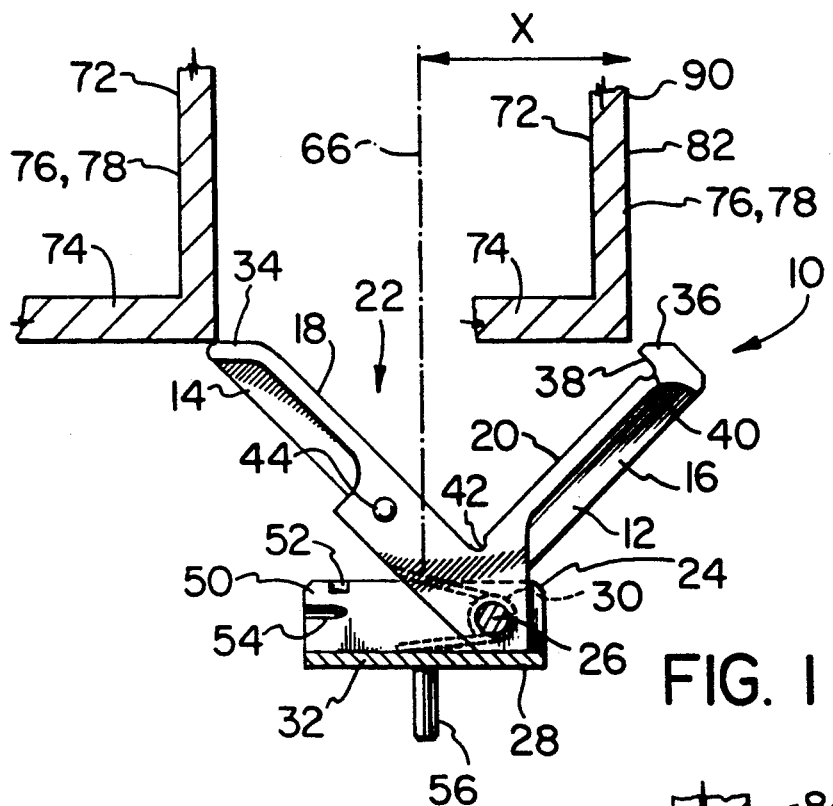
FIG. 1 is a side view of an alignment lever constructed in accordance with an embodiment of the present invention.
Figure 2:
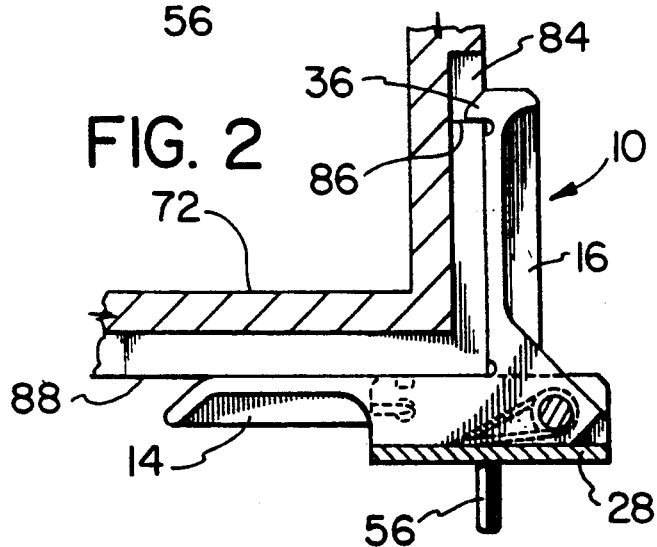
FIG. 2 is a side view similar to FIG. 1 showing the lever in a second position.
Figure 3:
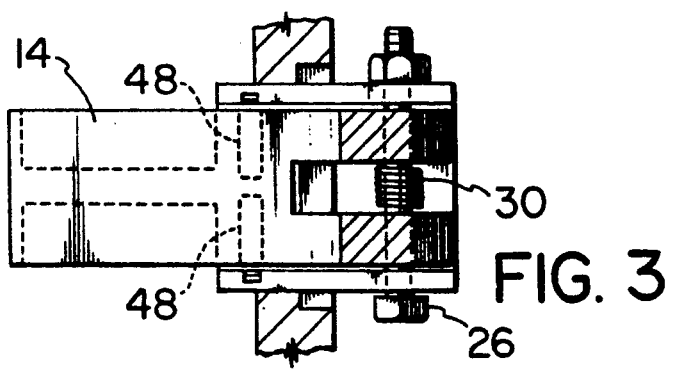
FIG. 3 is plan view of the lever of FIG. 2.

With reference to FIGS. 1 to 3 of the drawings, the reference numeral 10 refers generally to an alignment lever constructed in accordance with an embodiment of the present invention.

The alignment lever has a body 12 which has a bottom arm 14 and a side arm 16. The bottom face 18 is formed on the bottom arm 14 and a side face 20 is formed on the side arm 16. The bottom face 18 and side face 20 cooperate with one another to form a V-shaped alignment seat 22. A corner portion 24 projects outwardly from the junction of the proximal ends of the arms 14 and 16. Pivot pin 26 serves to pivotally connect the body 12 to a base 28. A spring 30 is mounted on the pivot pin 26 and has one end bearing against the outer face of the bottom arm 14 and another end bearing against the base plate 32 of the base 28. The spring 30 acts as a biasing means that normally urges the body 14 to pivot to the first position shown in FIG. 1 of the drawings.

The bottom arm 14 has an end face 34 at the distal end thereof which is inclined at an angle with respect to the bottom face 18 so as to extend generally parallel to the base plate 32 such that it is horizontally disposed when the lever arm is in the first position. A load retaining finger 36 is located at the distal end of the side arm 16 and has an inner face 38 which overlies a portion of the bottom face 18. Clearance notches 40 and 42 are provided at opposite ends of the side face 20 to accommodate minor irregularities in the structure of the orbital replacement unit.

A pair of detent balls 44 are mounted in passages 48 formed at opposite sides of the bottom arm 14 and are normally urged outwardly by means of compression springs located in the passages 48.

The base 28 has a pair of oppositely disposed side walls 50 that extend upwardly from the base plate 32. An inclined ramp 52 is formed at the upper edge of the inner face of each side wall 52. A V-groove-shaped seat 54 is formed on the inner face of each side wall 50. The ramp 52 serves to gradually deflect the detent balls 44 inwardly as the lever is pivoted from the first, outwardly inclined position shown in FIG. 1 to the second position shown in FIG. 2. When in the second, load accommodating, position shown in FIG. 2, the detents 44 are seated in the seats 54 and serve to releasably retain the lever 10 in the second position.

Figure 4:
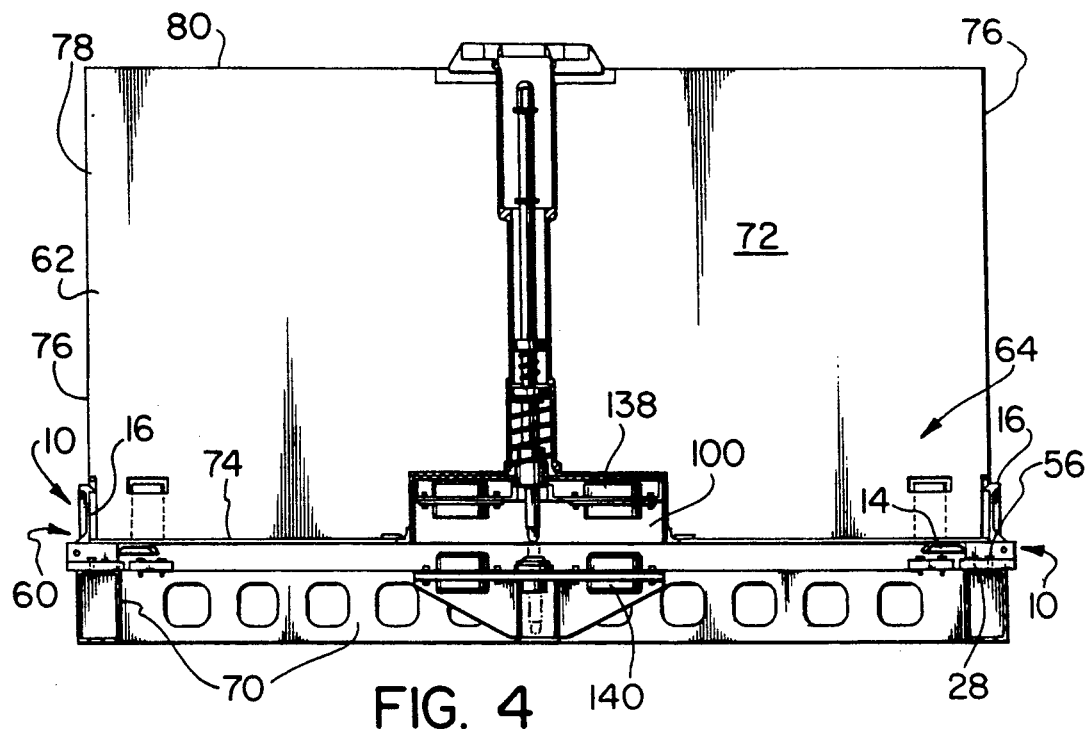
FIG. 4 is a sectioned side view showing an orbital replacement unit attached to the target area of an orbiter.
Figure 5:
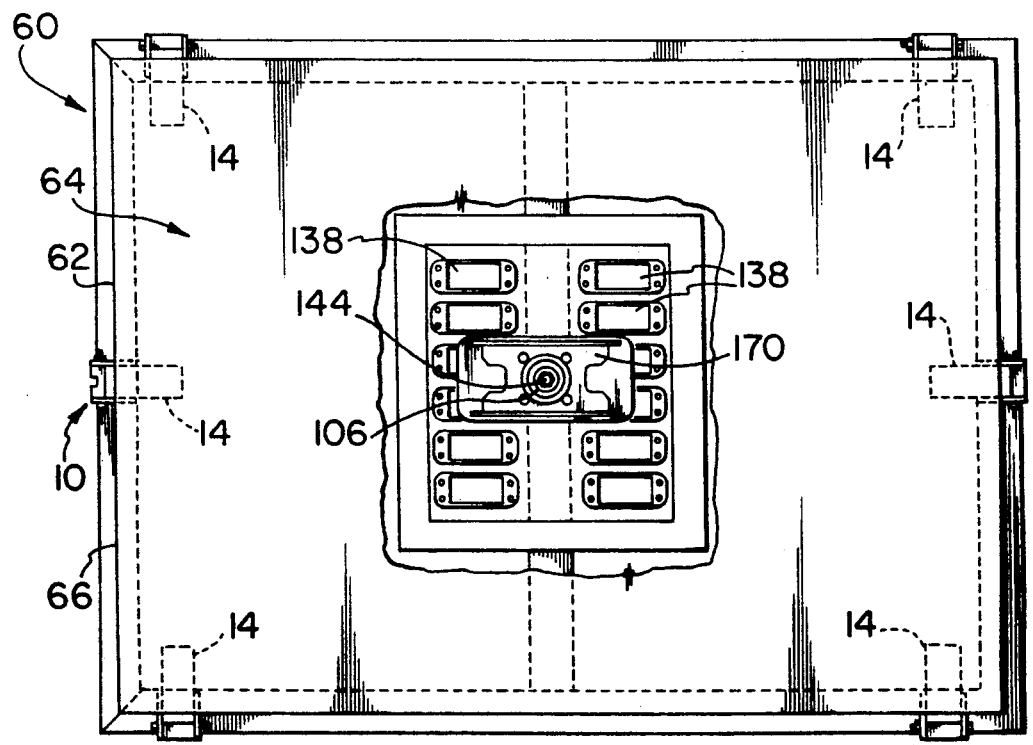
FIG. 5 is a plan view of the assembly of FIG. 4.

Mounting screws or rivets 56 are provided for securing each base 28 with respect to the support structure as illustrated in FIG. 4. With reference to FIGS. 4 and 5 of the drawings, an alignment assembly which is generally identified by the reference numeral 60 is provided for the purposes of aligning a load item such as the orbital replacement unit 62 with a target area generally identified by the reference numeral 64. A plurality of alignment levers 10 are located at spaced positions about the perimeter 66 of the target area with the bottom arms 14 arranged to project inwardly into the target area when the lever arms are in the second position.

As shown in FIG. 4, the base 28 of the alignment lever 10 is attached to the support structure 70 by means of the mounting screws or rivets 56.

The orbital replacement unit ORU 62 comprises a housing 72 which has a bottom wall 74 and oppositely disposed side walls 76 and 78 that extend upwardly from the bottom wall to a top wall 80.

Docking corners 82 (FIG. 1) are formed between the side walls 76, 78 and the bottom wall 74. A recess 84 is formed in the side walls 76, 78 at each of the docking corners 82 to receive the load retaining finger 36. Similar recesses are provided for the alignment levers 14 at intermediate positions between the docking corners 82. Each recess 84 has a bottom face 86 which is spaced from the bottom face 88 of the housing 72, a distance which is slightly less than the distance between the inner face 38 and the bottom face 18 of the lever so as to permit the lever to pivot from the second position to the first position as the orbital replacement unit is removed from the target area.

In use the biasing springs will serve to locate the alignment levers 10 in the first position shown in FIG. 1 prior to the docking of an orbital replacement unit. Consequently, all of the side arms 16 will project laterally outwardly from the perimeter 66 of the target area and will have the effect of enlarging the entry to the target area. In the position shown in FIG. 1 the alignment levers are space at 45° from the second position shown in FIG. 2.

In a typical installation the entry to the target area is enlarged by 2×X where as shown in FIG. 1, X is the distance between the perimeter 66 and the outer reach 90, which is typically about 1½ inches.

In use as the housing 72 approaches the target area within the reach of the lever arms, first contact with the lever arms will be with the end faces 34 of the lever arms located along one or more side edges of the perimeter. Further movement of the housing 72 toward the target area will cause each alignment lever to begin its movement toward the second position. As a result, each side lever arm 16 will begin to pivot towards the target area. If the housing 72 projects outwardly from the target area as shown in one arrangement in FIG. 1 for the right hand side, the arm 16 will be rotated in an anticlockwise direction into contact the side wall 76, 78 and will drive the housing 72 toward the position in which it is aligned with the perimeter 66 and is located in the position shown in FIG. 2 in which the load retaining fingers 36 extend into the recesses 84. It will be noted that the axis of the pivot pin 26 is spaced outwardly from the plane of the perimeter 66 with the result that the "reach" of the lever arm 16 is greater than that which would be achieved if the axis of the pin 26 was located in the plane of the perimeter 66.

From the foregoing, it will be apparent that the alignment levers will serve to provide an enlarged entry to the target area with the result that it is only necessary for an astronaut to initially align the ORU within the reach of the alignment levers in order to achieve the required alignment. This may serve to provide plus or minus 1.5 inches tolerance in the initial alignment requirements.

It will also be apparent that because the side arms 16 of each of the lever arms extend laterally outwardly from the perimeter 66, the lever arms will provide a visual cue to a robot operator or an EVA astronaut which will serve to indicate the direction in which adjustments must be made in order to locate the ORU within the reach of the docking area. In addition, if forceably moment sensing and accommodation is used for the purposes of docking, the alignment levers provide correct and unambiguous input to the operator and accommodation algorithms for enhancement and potential automated changeout. Furthermore, the correct positioning of a connector carriage is guaranteed before the connectors are mated as will be described hereinafter.

To release the ORU from the docking station, it is merely necessary to pull it away from the docking station. The side arms 16 of the alignment levers will be deflected outwardly as a result of the initial contact between the bottom faces 86 of the recesses 84 and the locking fingers 36 and will continue to be urged to move outwardly toward this first position by reason of the spring 30. The gaps formed between the fingers 36 and the bottom faces 86 are sufficient to ensure that the bottom arms 14 can pivot upwardly to a sufficient extent to permit continued movement of the alignment levers when the bottom faces 86 make contact with the fingers 36.

ATTACHMENT OF ORBITAL REPLACEMENT UNIT

Figure 6:
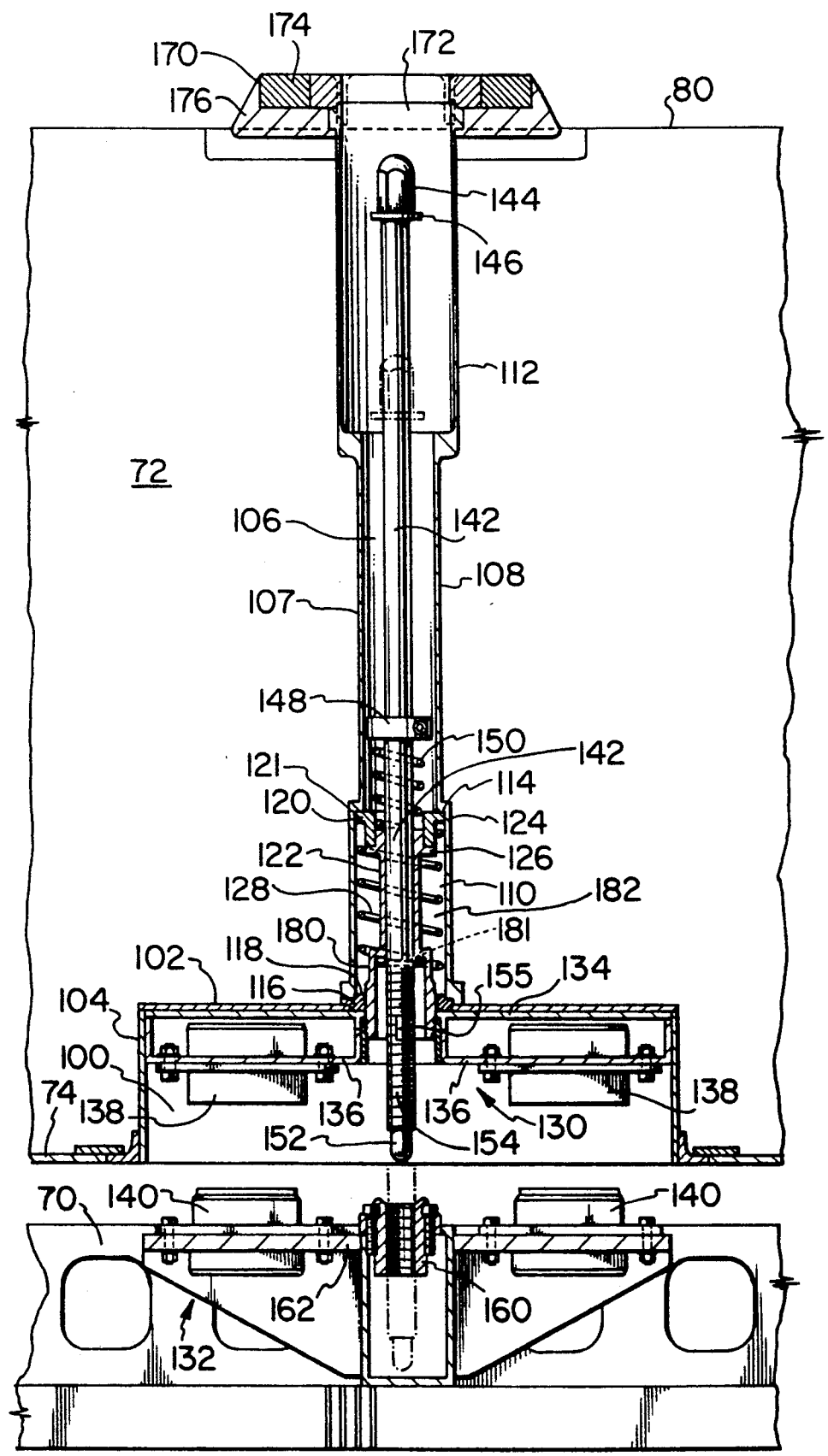
FIG. 6 is an enlarged detail of the mechanism that connects the ORU to the supporting structure.

The mechanism for attaching the orbital replacement unit to the support structure is illustrated in FIGS. 4, 5, and 6 of the drawings to which reference is now made.

As is most clearly shown in FIG. 6 of the drawings, the housing 72 has a recess 100 formed in the bottom or back wall 74. The recess 100 has an inner wall 102 and side walls 104. A passage 106 extends through a tubular member 107 which is mounted in the housing 72. The passage 106 extends from the top or front wall 80 to the recess 100. The passage 106 has a central portion 108, an enlarged back end portion 110 and an enlarged front end portion 112. A first shoulder 114 extends laterally between the lower end of the central portion 108 and the upper end of the back end portion 110. A ring 116 is located at the back end of the enlarged back end portion 110 and is formed with an end face 118 which forms a second shoulder and extends laterally inwardly of the portion 110 and is disposed opposite the first shoulder 114.

A first collar 120 is slidably mounted in the enlarged portion 110 for movement between a first position bearing against the first shoulder 114 and a second position space from the first position toward the back wall 74 of the housing. A sleeve 122 is located in the enlarged portion 110 and has a front end 124 which fits in a close-fitting relationship within the first collar 120 and has a shoulder 126 that bears against the back end of the collar 120. A compression spring 128 has an upper end that bears against the flange 121 of the collar 120 and a lower end that bears against the second shoulder 118. The compression spring 128 normally urges the first collar 120 and the sleeve 122 to the first position which is shown in FIG. 6 of the drawings.

A connector support which is generally identified by the reference numeral 130 is mounted on the lower end of the sleeve 122. The connector support includes a base panel 134 and bridges 136 on which a plurality of connectors 138 are mounted. The connector support 130 is mounted on the sleeve 122 for movement therewith from the retracted position shown in FIG. 6 to an extended position in which the connectors project outwardly from the recess 100 and mate with connectors 140 of the connector support 132 which is carried by the support structure 70.

A shaft 142 is mounted in the passage 106 for axial movement. The shaft has a hexagonal-shaped upper end portion 144 which terminates at a shoulder 146. The hexagonal-end portion 144 forms a suitable connection for attachment to a power tool of an end effector fitted with a corresponding socket. A second collar 148 is mounted on the shaft 142 and is located in the central portion 108 of the passage 106. The second collar 148 is clamped to the shaft 142 and a compression spring 150 extends from the collar 148 to the front end 124 of the sleeve 122. The compression spring 150 normally urges the shaft 142 to its retracted position which is shown in FIG. 6. The shaft 142 has a rounded nub 52 of reduced diameter at the back end thereof and a threaded portion 154 that extends from the nub 152. A thread locking plastic insert 155 is located on the threaded portion 154.

A threaded nut 160 is mounted in a platform 162 which is supported by the support structure 70. The connectors 140 are mounted on the platform 162.

An H-shaped interface 170 is mounted on the front wall 80 and has a passage 172 that extends therethrough which is aligned with the passage 106. H-shaped interfaces are well known and as a result, the structure will not be described in detail. The interface 170 includes an H-shaped bridge plate 174 mounted on legs 176 which serves to space it from the front wall 80 to permit a fixture to grasp the H-shaped interface as described in copending application Ser. No. 07/593,648 filed, Oct. 4, 1990.

In use after the orbital replacement unit has been aligned and docked using the alignment lever system previously described, the shaft 142 will be axially aligned with the nut 160. By using a tool such as a powered screwdriver which has a socket to accommodate the hexagonal-shaped upper end 144 of the shaft, it is possible to displace the shaft axially to cause the rounded nub 52 to enter the nut 160. The axial movement of the shaft toward the extended position will cause the collar 148 to compress the spring 150. By compressing the spring 150, a load is applied to the first collar 120. This load is not sufficient to compress the spring 128 which is a heavier spring than the spring 150 with the result that this load is applied as a preload to the housing 72 that urges the housing toward the support structure 70.

Continued axial movement and rotational movement of the shaft 142 causes the threaded portion 154 of the shaft to engage within the threaded bore of the nut 160. The shaft 142 will continue to advance toward its fully extended position and the collar 148 will come to bear against the first collar 120. Continued axial movement will cause the collar 120 and the sleeve 122 to move axially toward the extended position. This movement of the sleeve 122 and the collar 120 will compress the spring 128 and it will cause the connector support assembly 130 to move toward the connector support assembly 132 of the base. This movement will continue until the connectors 138 and 140 are operably mated.

From the foregoing, it will be apparent that the attachment mechanism used for attaching the orbital replacement unit makes provision for the correct and accurate alignment of the various connectors before the connectors are driven into mating engagement with one another.

In order to separate the orbital replacement unit 72 from the base 70, the head 144 of the shaft 142 is again accessed through the opening 172 of the interface 170 and is rotatably driven in the direction required to cause the shaft to begin to move axially toward its retracted position. Initially, this movement will cause the sleeve 122 to move axially with the shaft under the influence of the compression spring 128 and this action will serve to displace the connector support 130 with respect to the connector support 132 to withdraw the connectors 138 from engagement with the connectors 140. This disconnection will continue until the connectors 138 are fully retracted and the spring 128 is fully extended and further movement of the sleeve is arrested by the shoulder 114. Thereafter, the continued axial movement of the shaft will be caused by the spring 150 as it extends to its relaxed configuration. This will serve to remove the preload from the orbital replacement unit so that the unit can then be removed from the base 70 as previously described.

From time to time, difficulty is experienced in attempting to separate connectors such as the connectors 138 and 140 from their mated position. To solve this problem, I provide a third collar 180 which is mounted on the shaft 142 by means of a pin 181. The collar 180 is located in a recess 182 that is formed at the back end of the sleeve 122. If during the movement of the shaft 142 to its retract position, the spring 128 does not exert sufficient force to cause the connectors 138 to withdraw from the connectors 140, the collar 180 will move into contact with the end wall of the recess 182 of the sleeve and continued axial movement will cause the shaft 142 to positively displace the sleeve 122 to forcefully extract the connectors 138 from the connectors 140.

Figure 7:
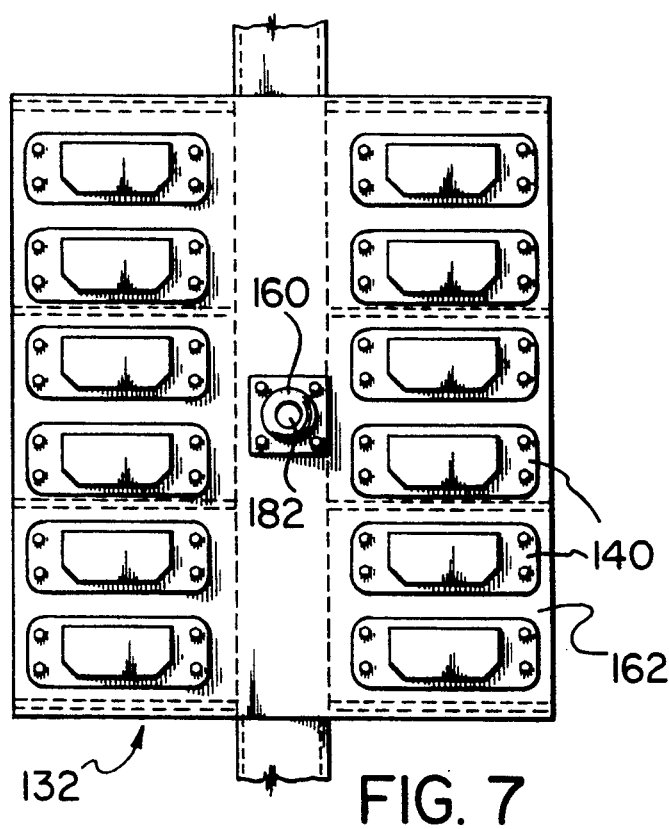
FIG. 7 is a plan view of the connector assembly of the orbiter taken along the line A—A of FIG. 4.
Figure 8:
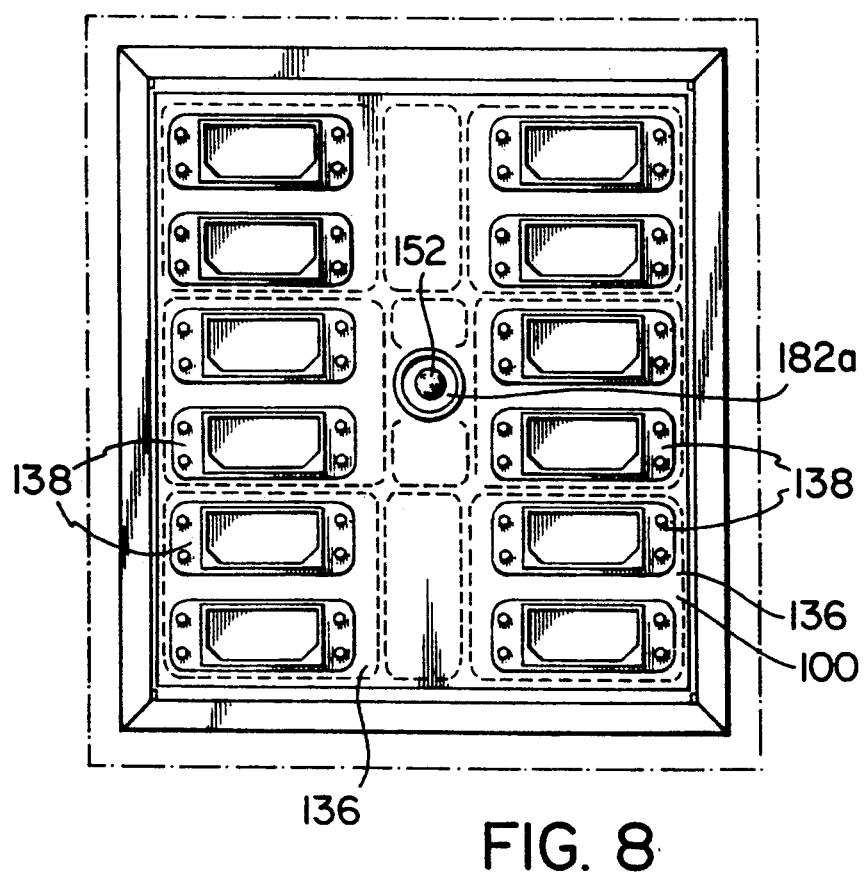
FIG. 8 is a plan view of the connector assembly of the orbital replacement unit taken along the line B—B of FIG. 4.

As shown in FIG. 7, the connector assembly 132 has a plurality of connectors 140 mounted hereon in a predetermined fixed relationship with respect to the access 182 of the threaded nut 160. As and shown in FIG. 8, the connector assembly 130 has a plurality of connectors 138 which are similarly located in a predetermined fixed relationship with respect to the access 182 of the shaft 152.

From the foregoing, it will be apparent that the present invention provides a simple and effective alignment lever system for receiving and aligning a load item with respect to a target.

It will also be apparent that the present invention provides a simple and effective mechanism for releasably attaching an ORU to a target site including a mechanism that will ensure that the connectors that are carried by the ORU will mate effectively with the connectors that are carried by the support structure.

I claim:

1. A docking system for aligning an orbital replacement unit with a target area as the orbital replacement unit moves toward the target area in a direction that is substantially perpendicular to the target area and for making electrical connection with the orbital replacement unit, the target area being located within a perimeter, the orbital replacement unit having docking corners formed between an end wall and a side wall thereof; a housing having a front face and a back face; a recess formed in said back face; a passage extending through said housing from the front face to the recess; a shaft mounted in said passage for axial and rotational movement; a connector assembly mounted for movement from a retracted position located within the recess and an extended position projecting from the recess, said assembly including an orbital replacement unit electrical connector; orbital replacement unit transfer means connecting the shaft to the connector assembly and operable to move the connector assembly to and fro between the retracted position and the extended position, said docking system comprising:

a) a plurality of alignment levers each comprising;
   i) a body which has a V-shaped alignment seat formed between a bottom face and a side face and arranged to accommodate the corner of an orbital replacement unit,
   ii) pivot means adjacent proximal ends of the bottom and side faces supporting the body for pivotal movement of the alignment seat between a first position and a second position,
b) said alignment levers being located at spaced locations about the perimeter of the target area for pivotal movement such that the first position is one in which the side faces of the seats are inclined outwardly and upwardly from the target area to form a target zone which is larger than the target area and wherein the bottom faces are upwardly and inwardly inclined with respect to the target area to form contacts which overlie the target area so as to contact the orbital replacement unit as it approaches the target area to be driven thereby to the second position in which the bottom and side faces of the seats extend in a face-to-face relationship with respect to the end and side faces of an orbital replacement unit when it is aligned with and seated on the target area, the movement of the side faces of the lever arms from the first position to the second position serving to align the orbital replacement unit with the target area when the orbital replacement unit is initially located within the target zone and out of alignment with the target area;
c) a docking system electrical connector arranged to be aligned with the orbital replacement unit electrical connector when the orbital replacement unit is aligned with the target area; and
d) a nut adapted to mate with the shaft of the orbital replacement unit in response to rotational movement of the shaft, whereby, when the orbital replacement unit is aligned with the target area and the shaft mates with the nut, the orbital replacement unit transfer means may be operated to move the connector assembly to and fro between the retracted position and the extended position to connect and disconnect the first and second connectors in response to axial movement of said shaft.

2. An alignment lever assembly for receiving and aligning a load item comprising;
a) a body which has a bottom arm and a side arm that diverge outwardly from a corner portion located at the junction of the proximal ends thereof, the bottom arm and the side arm having a bottom face and a side face respectively that cooperate with one another to form a V-shaped alignment seat therebetween which serves to accommodate the corner of the load item,
b) a base for supporting the body proximate a target area, c) pivot means pivotally connecting the corner portion of the body to the base for pivotal movement of the body, by the load, with respect to the base to rotate the alignment seat through an arc of about 45° between a first, outwardly inclined, position and a second, load accommodating position, d) biasing means engaging the base and the body and normally urging said body to said first position, e) means for releasably retaining the body with respect to the base when the alignment seat is in said second position, f) said bottom arm having a distal end at which an end face is located which is inclined forwardly from the bottom face and away from the side face of the alignment seat to form a strike face that extends substantially parallel to the base, g) said side arm having a distal end at which a load retaining finger is located which extends inwardly of the alignment seat from the side face thereof to overly a portion of the bottom face and releasably retain a load item therebetween when said alignment seat in said second position in use.

3. An assembly as claimed in claim 2 wherein each bottom arm has a distal end which has an end face formed thereon which is inclined at an angle with respect to the bottom face so as to be generally horizontally disposed when the alignment seat is in said first position.

4. An alignment lever assembly for aligning a load item with a target area as the load item moves toward the target area in a direction that is substantially perpendicular to the target area, the target area being located within a perimeter, the load item having docking corners formed between an end wall and a side wall thereof said assembly comprising;

a) a plurality of alignment levers each comprising;
  i) a body which has a V-shaped alignment seat formed between a bottom face and a side face and arranged to accommodate the corner of a load item,
  ii) pivot means adjacent proximal ends of the bottom and side faces supporting the body for pivotal movement of the alignment seat between a first position and a second position, b) said alignment levers being located at spaced locations about the perimeter of the target area for pivotal movement such that the first position is one in which the side faces of the seats are inclined outwardly and upwardly from the target area to form a target zone which is larger than the target area and wherein the bottom faces are upwardly and inwardly inclined with respect to the target area to form contacts which overly the target area so as to contact the load item as it approaches the target area to be driven thereby to the second, load accommodating position in which the bottom and side faces of the seats extend in a releasably retaining, face-to-face relationship with respect to the end and side faces of a load item when it is aligned with and seated on the target area, the movement of the side faces of the lever arms from the first position to the second position serving to align the load item with the target area when the load item is initially located within the target zone and out of alignment with the target area.

* * * * *